US012042806B2

(12) United States Patent
Legrand

(10) Patent No.: US 12,042,806 B2
(45) Date of Patent: Jul. 23, 2024

(54) MOLD IN PLUMBING FOR WAX APPLICATION

(71) Applicant: Honda Motor Co., Ltd., Tokyo (JP)

(72) Inventor: Kyle Justin Legrand, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 6 days.

(21) Appl. No.: 17/844,449

(22) Filed: Jun. 20, 2022

(65) Prior Publication Data

US 2023/0405623 A1 Dec. 21, 2023

(51) Int. Cl.

| | |
|---|---|
| ***B05B 13/06*** | (2006.01) |
| ***B05B 13/02*** | (2006.01) |
| ***B05D 1/02*** | (2006.01) |
| ***B05D 7/14*** | (2006.01) |
| ***B05D 7/22*** | (2006.01) |

(52) U.S. Cl.
CPC ...... *B05B 13/0636* (2013.01); *B05B 13/0285* (2013.01); *B05B 13/0627* (2013.01); *B05D 1/02* (2013.01); *B05D 7/14* (2013.01); *B05D 7/22* (2013.01)

(58) Field of Classification Search
None
See application file for complete search history.

(56) References Cited

U.S. PATENT DOCUMENTS 2,109,075 A * 2/1938 Ruth .................... B08B 9/0936 134/179
3,895,756 A * 7/1975 Jaeger .................... B05B 3/14 118/317
4,108,382 A 8/1978 Ryd et al.
4,351,478 A * 9/1982 Looper .................... B05B 3/14 239/227
4,739,933 A * 4/1988 Hanano .............. B22D 17/2007 239/335
5,066,518 A 11/1991 Klingen
5,419,922 A * 5/1995 Bajek .................... F27D 1/1636 427/427
7,089,949 B1 * 8/2006 Rogerson .............. B08B 9/0936 118/317
(Continued)

FOREIGN PATENT DOCUMENTS

CN 110756405 2/2020
DE 102011109045 3/2012
(Continued)

*Primary Examiner* — Binu Thomas
(74) *Attorney, Agent, or Firm* — RANKIN, HILL & CLARK LLP

(57) ABSTRACT

A system and method include a frame member and an applicator. The frame member includes a hollow frame and a distribution component arranged in the interior of the frame. The distribution component includes a base component and a conduit on its exterior surface. The applicator delivers a fluid, which can include an anti-corrosion material, to the distribution component, which fluid is then delivered by the conduit throughout the interior of the frame and ejected through discharge openings of the conduit onto the interior surface of the frame to coat the frame with the fluid. The fluid may form an anti-corrosion coating on the interior surface of the frame.

20 Claims, 6 Drawing Sheets

(56) References Cited

U.S. PATENT DOCUMENTS

| | | | | |
|---|---|---|---|---|
| 10,870,124 | B2 | 12/2020 | Doll et al. | |
| 2004/0099699 | A1 * | 5/2004 | Zubeck | B05C 7/02 222/527 |
| 2004/0222322 | A1 * | 11/2004 | Erhard | B05B 15/65 239/548 |
| 2014/0263752 | A1 * | 9/2014 | Steiner | B05B 13/0278 239/418 |
| 2019/0314831 | A1 * | 10/2019 | Kulkarni | B05B 13/0627 |

FOREIGN PATENT DOCUMENTS

| | | | | |
|---|---|---|---|---|
| DE | 102012003316 | | | 1/2013 |
| DE | 202015009893 | | | 3/2021 |
| FR | 2973262 | | | 4/2013 |
| JP | 2009208015 | | | 9/2009 |
| KR | 20020080967 | | | 10/2002 |
| KR | 20020080967 | A | * | 10/2002 |

* cited by examiner

MOLD IN PLUMBING FOR WAX APPLICATION

BACKGROUND

A vehicle frame member may have two metal parts welded together along their interface to define a hollow interior. Over the lifetime of the vehicle, the frame member may accumulate electrolytic liquid, e.g. water, inside the hollow interior, which may cause the metal frame member to rust on the inside.

To inhibit this rusting, the interior surface of the frame member, including the welded interface between the two welded members, may be coated with a rust-inhibiting material. A single hole in the frame member may be used to provide access for inserting an applicator into the interior for applying the rust-inhibiting material to the interior surface. However, many frame members include internal obstructions or obstacles that inhibit this process by blocking the applicator from being inserted all the way along the hollow interior, thus making it difficult to apply full coverage of the rust-inhibiting material to the entire interior surface. Therefore, many frame members include several such holes, more than one applicator may be needed, and these applicators may need to be specially designed so as to be inserted through the holes to coat hard-to-reach interior surfaces.

The formation of these holes and the design, fabrication, and maintenance of the one or more applicators may add significantly to the time and overall cost of producing the frame member.

BRIEF DESCRIPTION

According to one aspect, a frame member includes a hollow frame, which defines an interior and includes an access opening that provides access to the interior. The frame member also includes a distribution component in the interior of the frame. The distribution component includes a base component and a hollow conduit on an exterior surface of the base component. The conduit includes an intake opening and a discharge opening. The intake opening is arranged at the access opening and is operable to receive a fluid from exterior of the frame, through the access opening, and into the conduit. The conduit is operable to transport the fluid from the intake opening to the discharge opening. The discharge opening is operable to eject the fluid out of the conduit onto an interior surface of the frame. A system includes this frame member along with an applicator operable to deliver the fluid from the exterior of the frame and into the conduit via the intake opening. A vehicle includes this frame member along with a coating of the fluid on the interior surface of the frame, and the fluid includes an anti-corrosion material operable to inhibit corrosion of the frame.

According to another aspect, a method of applying a coating to an interior surface of a frame includes providing the frame and a distribution component. The frame defines an interior and includes an access opening that provides access to the interior. The distribution component includes a shell and a conduit on an exterior surface of the shell. The conduit includes an intake opening and a discharge opening. The method includes arranging the distribution component in the interior of the frame such that the intake opening is arranged at the access opening. The method includes delivering a fluid from an exterior of the frame, through the access opening, through the intake opening, and into the conduit. The method includes transporting the fluid through the conduit from the intake opening to the discharge opening, and discharging the fluid from the discharge opening onto the interior surface of the frame to thereby form the coating of the fluid on the interior surface.

DETAILED DESCRIPTION

Figure 1:
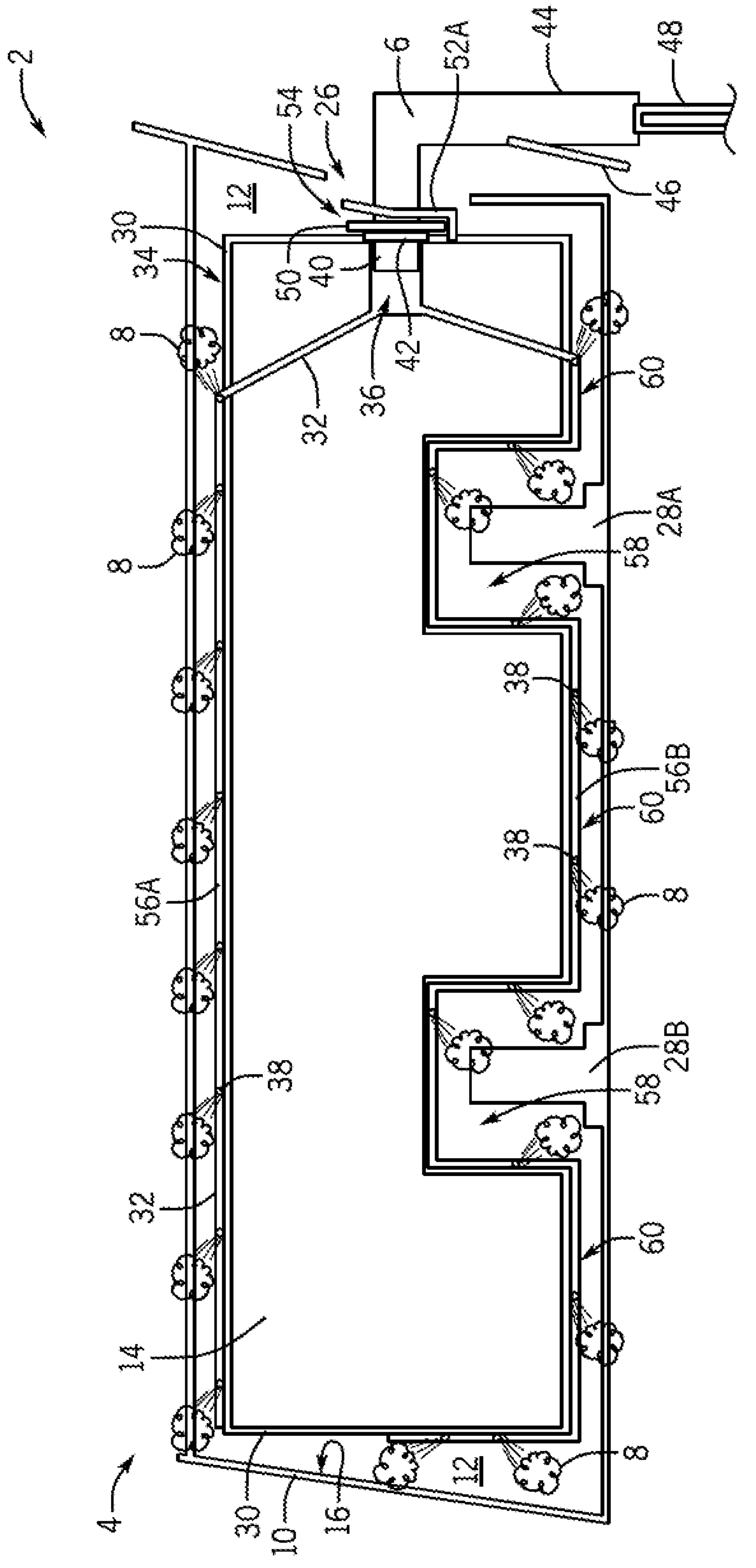
FIG. 1 is a cross-sectional side view of a system according to the present subject matter.
Figure 2:
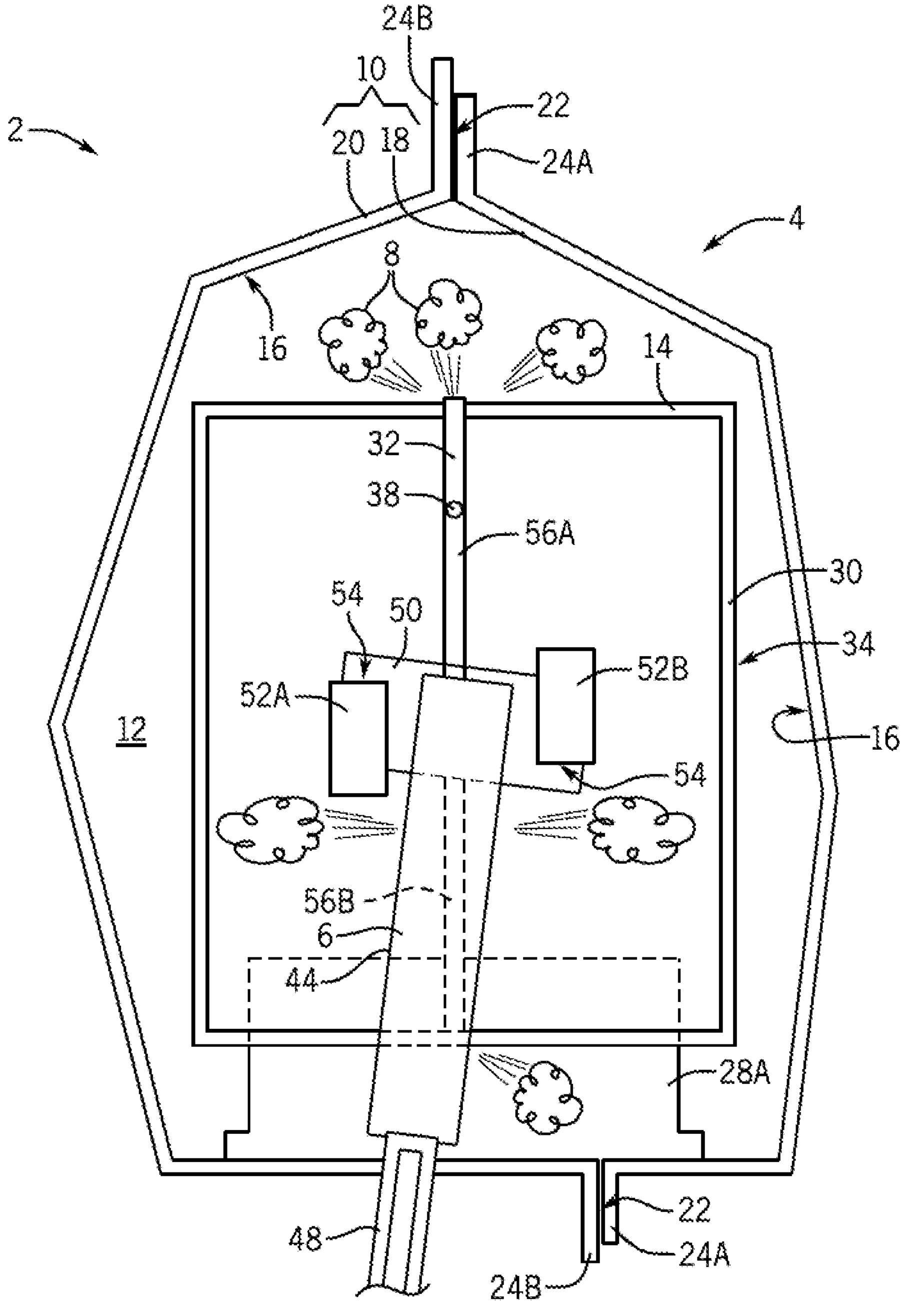
FIG. 2 is a cross-sectional end view of a system according to the present subject matter.

Referring to the figures, a system 2 includes a frame member 4 and an applicator 6 for delivering a fluid 8 to the frame member 4. The system 2 can be employed for use in making the frame member 4 as a standalone part, or as a part for a vehicle, building, or other structure. The frame member 4 includes a hollow frame 10 defining an interior 12 in which a distribution component 14 is arranged. The applicator 6 is used to deliver the fluid 8 to the distribution component 14, which distributes the fluid 8 through the interior 12 of the frame 10 and to an interior surface 16 of the frame 10 so as to coat the interior surface 16 of the frame 10 with the fluid 8. The entire interior surface 16 may be coated with the fluid 8, or only portions thereof may be coated with the fluid 8.

The fluid 8 can include any fluid capable of flowing through the applicator 6 and forming a coating on the interior surface 16 of the frame 10. The fluid 8 can include anti-corrosion fluids, including an anti-corrosion wax, for example, which may be heated to be a liquid during its application, but hardening to form a coating on the interior surface 16 after application. The fluid 8 may form a coating on the interior surface 16 of the frame 10, and such coating may have anti-corrosion properties and/or other properties with respect to the frame 10.

Once the fluid 8 coats the interior surface 16, the frame member 4 may be employed as a standalone component, or as part of a vehicle or other structure such as a building, and may be used as a pillar, post, or other frame-type component.

Frame

The frame 10 is not particularly limited, and may be rigid or flexible, and can include various materials and combinations/composites thereof. These materials may include metal, polymer, glass, ceramic, wood, plastics, cellulose, carbon, stone, etc. In a non-limiting example, the frame 10 is rigid and including metal.

The frame 10 may include one or more parts, and in a non-limiting example includes a first metal component 18 and a second metal component 20. The frame 10 can also include other metal or non-metal components, but this may not be required. The first metal component 18 and the second metal component 20 may be mated at an interface 22. As shown in the figures, the interface 22 is formed by mating together two flanges 24A, 24B of the respective first and second metal components 18, 20. The flanges 24A, 24B of the respective first and second metal components 18, 20 may be welded together at the interface 22 while the distribution component 14 is between the first and second metal components 18, 20, thus forming/defining the interior 12 between the joined first and second metal components 18, 20 and having the distribution component 14 in the interior 12. The welded flanges 24A, 24B may not be necessary, and the two metal components 18, 20 may be mated in a different arrangement, and/or by a different method. The first metal component 18 and a second metal component 20 may be joined together at the interface 22 by a weld, adhesive, mechanical attachment, or combinations thereof. If welded together, the weld type, configuration, and means of formation is not limited, and may include solid state welding, fusion welding, soldering, brazing, pressure welding, forging, etc.

The frame 10 includes an access opening 26 providing access to the interior 12 and through which the applicator 6 is inserted and delivers the fluid 8 to the interior 12 of the frame 10 and to the distribution component 14 therein. The access opening 26 is arranged on the right end of the frame 10 in FIG. 1, but this may not be required, and the access opening 26 can be arranged anywhere on the frame 10. The frame 10 is shown to include only one access opening 26, but this may not be required, and the frame 10 can include more than one access opening 26 through which the applicator 6 can deliver the fluid 8 to the distribution component 14. The frame 10 may include other opening(s) that are not used to deliver the fluid to the distribution component 14.

The frame 10 may include internal feature, e.g. obstructions such as collars, bulkheads, or turns or kinks in the frame 10. As seen in FIG. 1, the frame 10 includes two internal features, i.e. bulkheads 28A, 28B, which project from the interior surface 16 of the frame 10 and into the interior 12, and may be included to strengthen the frame 10. The frame 10 can include more or less bulkheads than that depicted in the figures.

Distribution Component

The frame member 4 includes the distribution component 14 in the interior 12 of the frame 10, which is used to distribute the fluid 8 to coat the fluid 8 on the interior surface 16 of the frame 10. The distribution component 14 may be arranged in the interior 12 of the frame 10 by being placed between the first and second metal components 18, 20 before they are joined (e.g. welded) together at the interface 22 to form the frame 10.

The distribution component 14 includes a base component 30 and one or more conduits 32 through which the fluid 8 is delivered to coat the interior surface 16 of the frame 10. The distribution component 14 is shown in the figures to include only one conduit 32, but this may not be required and more than one conduit 32 may be included as part of the distribution component 14. For convenience, only one conduit will be discussed, but the description applies to all such conduits included as part of the distribution component 14.

Figure 3:
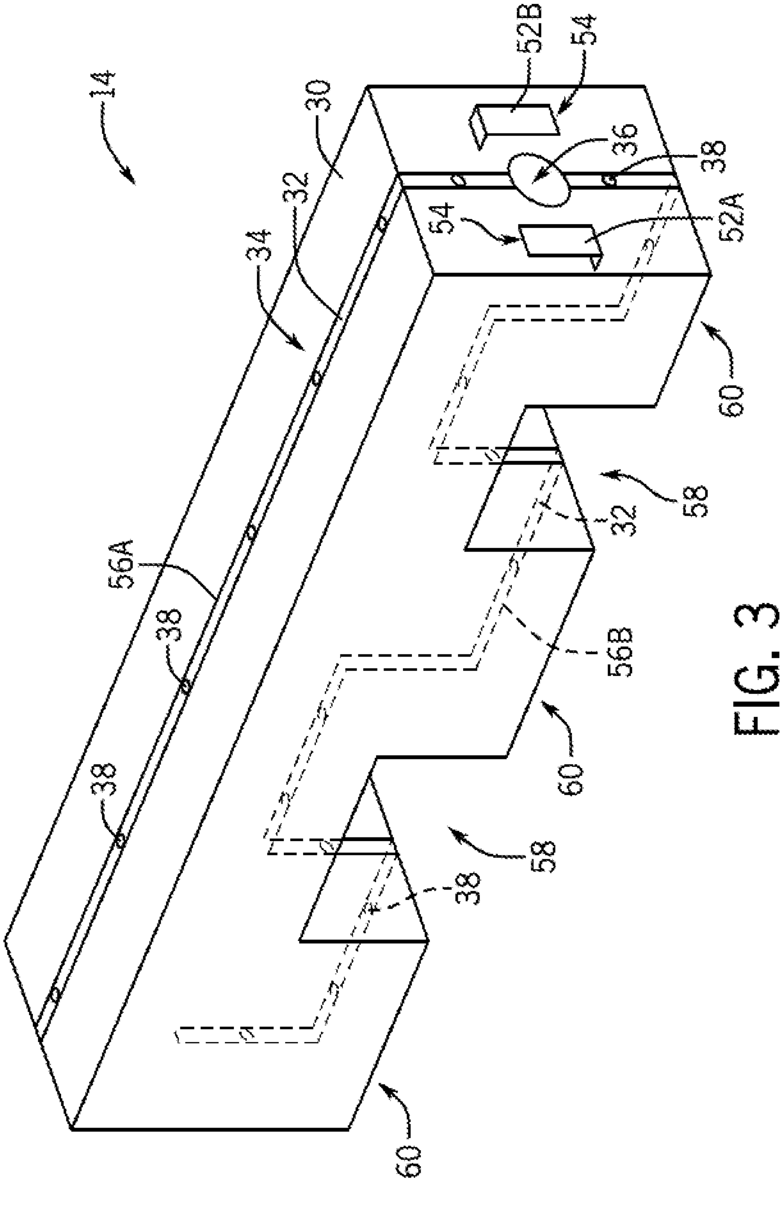
FIG. 3 is a perspective view of a distribution component according to the present subject matter.
Figure 4:
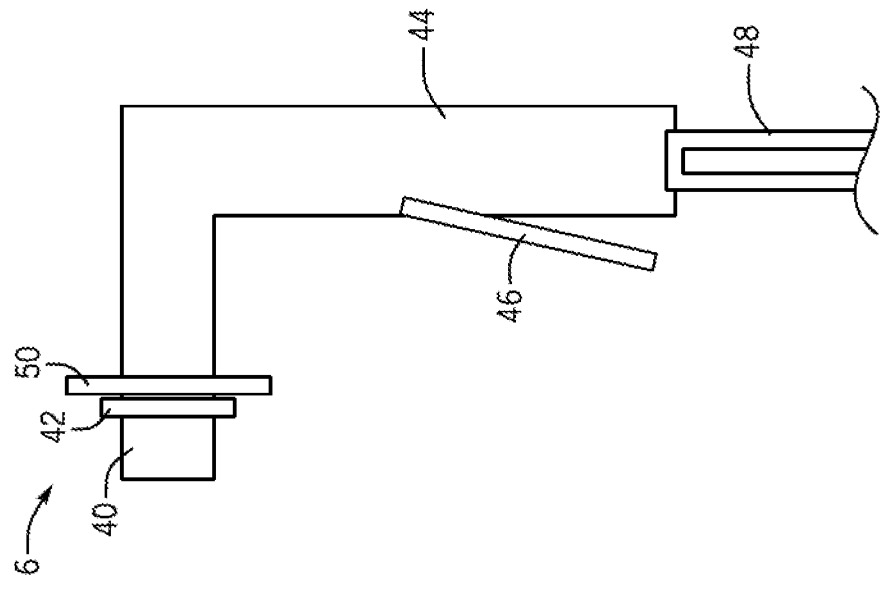
FIG. 4 is a side view of an applicator according to the present subject matter.
Figure 5:
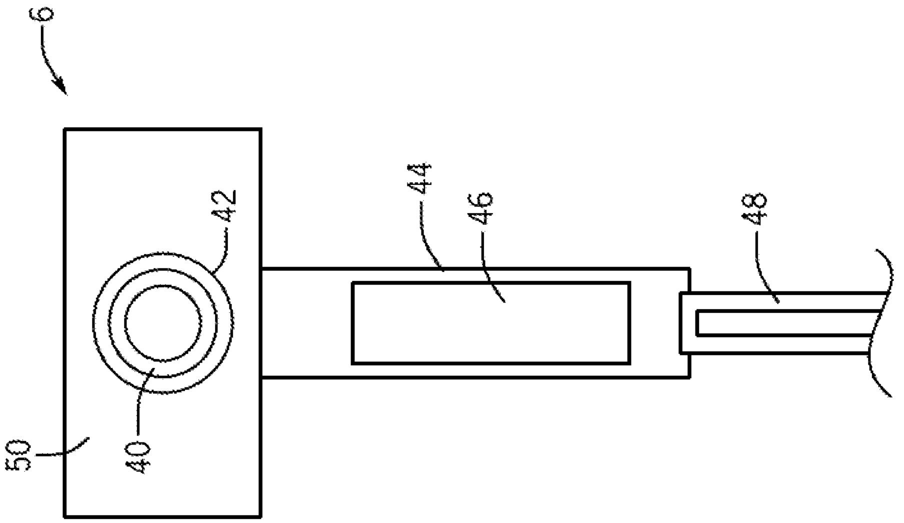
FIG. 5 is a front view of the applicator of FIG. 4.

The conduit 32 is operable or configured to deliver the fluid 8 throughout the interior 12 of the frame 10 and discharge the fluid 8 onto the interior surface 16 of the frame 10. The conduit 32 may be in the form of a hollow tube, e.g. with a closed wall surrounding the hollow interior. The conduit 32 may be arranged entirely on the exterior surface 34 (FIG. 3) of the base component 30, or only a portion of the conduit 32 may be arranged on the exterior surface 34 while another portion of the conduit 32 is arranged under/inside the exterior surface 34 (FIG. 1). The conduit 32 may be formed by various ways on the exterior surface 34 or inside the exterior surface 34. In a non-limiting example, such as where portions of the conduit 32 are formed under the exterior surface 34, the conduit 32 may be formed by molding a first piece defining a first half of the conduit 32 and molding a second piece defining a second half of the conduit 32, and then joining the first piece and the second piece to form the whole conduit 32. In another non-limiting example, such as where portions of the conduit 32 are formed on the exterior surface 34, the conduit 32 may be formed by over-molding it on the base component 30, and the material used in the over-molding process to form the conduit 32 may be different from the material used to form the base component 30.

The conduit 32 includes an intake opening 36 and one or more discharge openings 38. The intake opening 36 is arranged at the access opening 26 of the frame 10, and is operable or configured to receive the fluid 8 from exterior of the frame 10, through the access opening 26, and into the conduit 32. The intake opening 36 may be facing the access opening 26 for receiving the fluid 8 that is being delivered by the applicator 6 from exterior of the frame 10, through the access opening 26, and into the conduit 32. The intake opening 36 is operable or configured to mate with the applicator 6 inserted through the access opening 26 to thereby receive the fluid 8. The intake opening 36 may have a shape that corresponds to a shape of a nozzle 40 of the applicator 6.

The intake opening 36 is shown in the figures to be arranged near a middle of the length of the conduit 32, with a plurality of (e.g. two) branches 56A, 56B of the conduit 32 extending away from the intake opening 36. This may not be required, and the intake opening 36 can be arranged at one end of the conduit 32 so that the conduit 32 only has one branch extending away from the intake opening 36.

The conduit 32 is operable or configured to transport the fluid 8 from the intake opening 36 and to the discharge openings 38. The discharge openings 38 are operable or configured to then discharge the fluid 8 from the conduit 32 and toward the interior surface 16 of the frame 10 to coat the interior surface 16 with the fluid 8. The discharge openings 38 are through holes in a wall of the conduit 32 from an exterior of the conduit to the hollow interior. The discharge openings 38 may be arranged and/or operable so as to discharge/eject the fluid 8 out of the conduit 32 and onto the interior surface 16 of the frame 10. The discharge openings 38 may discharge the fluid 8 only toward specific parts of the interior surface 16, or toward the entire interior surface 16.

In a non-limiting example, the discharge openings 38 are arranged to discharge the fluid 8 at the interface 22, i.e. so that it coats at least the part of the interior surface 16 at the interface 22. The interface 22, which may be welded and thus subjected to extreme heat conditions during welding, could therefore be a location where rust may form on the frame 10 if exposed to an electrolyte. If the fluid 8 includes an anti-corrosion fluid or material, such as wax, then application of the fluid 8 to cover the interior surface 16 at the interface 22 may form an anti-corrosion coating thereon, and thereby inhibit an electrolyte (e.g. water) from reaching the interface 22 from the interior 12 and thus, along with an optional anti-corrosion coating on the exterior of the interface 22, may inhibit rust from forming at the interface 22. In another non-limiting example, the entire interior surface is coated with the fluid 8.

The discharge openings 38 may be small holes in the conduit 32, that can be spaced (e.g. evenly spaced) along the length of the conduit 32. The discharge openings 38 may be nozzles that cause the discharged fluid 8 to have a particular shape (such as a cone, jet, mist, spray, etc.) and/or that cause the fluid 8 to discharge in a desired direction away from the discharge openings 38 and conduit 32, e.g. toward the interface 22. The coating process may form a coating of the fluid 8 on the interior surface 16 along the entire interface 22 thus covering the entire interface 22 at the interior surface 16, or on the interior surface 16 along only a portion of the interface 22 thus covering only a portion of the interface 22 at the interior surface 16.

The distribution component 14 may be shaped and sized to correspond to the shape and size of the interior 12 of the frame 10, including to accommodate any internal obstruction, e.g. the bulkheads 28A, 28B, that may be present in the interior 12. For example, if the frame 10 includes an internal obstruction, e.g. the bulkheads 28A, 28B, then the shape of the distribution component 14 can simply be chosen to take into account such internal obstructions. This is done because the internal obstruction may block a straight line between the access opening 26 and areas (i.e. "blocked areas") behind the internal obstruction. Using a conventional applicator, such as sprayer, the blocked areas might not be coated with the fluid since the spray of fluid from the sprayer would be blocked by the internal obstructions.

To accommodate for such blockage, the distribution component 14 may include corresponding feature (e.g. indentations 58 and protrusions 60) that are shaped and sized so as to go around the internal obstructions, and thus may surround the internal obstruction/feature on three sides, i.e. in a first direction, in a second direction perpendicular to the first direction, and in a third direction perpendicular to the second direction and parallel to the first direction. This is shown, for example, in FIG. 1, where the two bulkheads 28A, 28*b* are surrounded by the distribution component 14 on three sides, and the conduit passes by the bulkheads 28A, 28*b* to delivery fluid 8 to the blocked areas behind the bulkheads 28A, 28B. In this way, the distribution component 14 may deliver the fluid 8 via the conduit 32 over/around/underneath the internal obstructions to the blocked areas of the interior surface 16.

As opposed to a conventional frame—which because of internal obstructions or obstacles may include a plurality of holes and specifically designed applicators for each hole so as to be able to coat all the desired portions of the interior surface of the conventional frame—the present distribution component 14 allows the fluid 8 to be delivered by a single applicator 6 through a single access opening 26, and allows the fluid 8 to be distributed around any such internal obstruction, e.g. the bulkheads 28A, 28B, so as to coat any portion of the interior surface 16 of the frame 10.

The distribution component 14 may include any material, and in a non-limiting example includes a molded polymer material. The distribution component may constitute a one-piece component where the base component 30 and the conduit 32 are one-piece. For example, the base component 30 and the conduit 32 may be integrally formed as part of the one-piece distribution component 14 by a molding process using the same polymer material. Alternatively, the distribution component 14 may constitute a multi-piece component, where the base component 30 and the conduit 32 are separate components that are formed from separate production processes, and then attached to each other by various means such as adhesives or mechanical connectors. The base component 30 may be hollow or solid and the conduit 32 is hollow. If hollow, the base component 30 may be a hollow shell and may be molded from polymer material.

The distribution component 14 may be retained in place in the interior 12 and relative to the frame 10 by a friction fit with the frame 10, by adhesive between the distribution component 14 and the frame 10, by mechanical connection between the distribution component 14 and the frame 10, or by other means. This connection between the distribution component 14 and the frame 10 may secure/mount the intake opening 36 relative to the access opening 26 in the frame 10. Alternatively, the intake opening may be secured/mounted relative to the access opening 26 by a connection directly between the intake opening 36 and the access opening 26.

The intake opening 36 may be operable or configured to mate with the applicator 6, for example, with the nozzle 40 of the applicator 6, which may be mated with the intake opening 36 by being inserted through the access opening 26 and inside the intake opening 36. The applicator 6 may further include a sealing body 42 (e.g. a resilient O-ring) operable or configured to create a seal with the intake opening 36 at the connection between the intake opening 36 and the nozzle 40 to inhibit the fluid 8 from leaking out of this connection.

The distribution component 14 may be flexible or rigid. In a non-limiting example, the distribution component 14 is rigid, and may be formed from a crash tough plastic, which is strong enough relative to the frame 10 so as to contribute to the overall strength of the frame member 4. In this way, the distribution component 14 can have dual functions of distributing the fluid 8 and providing added strength to the frame member 4 such that the combination of the frame 10 and distribution component 14 is stronger than just the frame 10.

Applicator

The applicator 6 is used to deliver the fluid 8 from a fluid source (not shown) that is exterior of the frame member 4 and into the conduit 32 via the intake opening 36. The fluid source may be a tank for example, and may deliver the fluid 8 under pressure to the applicator 6, which pressure may be produced by a pump (not shown). The applicator 6 is inserted through the access opening 26 and then mates with the intake opening 36 for delivering the fluid 8 into the conduit 32. The applicator 6 is not particularly limited, and may include any suitable delivery means for delivering the fluid 8 to the intake opening and into the conduit 32.

In a non-limiting example, the applicator 6 may include the nozzle 40, which can be inserted into and mate with the intake opening 36. The applicator may include the sealing body 42 for forming a seal with the intake opening 36 to prevent leaks of the fluid 8 past the sealing body 42.

The applicator 6 may be automatic or user operated. In a non-limiting example, as shown in the figures, the applicator 6 is a hand-held, hand-operated, user-operated tool including a handle 44, a trigger 46, and a fluid delivery line 48 connected to the fluid source. The handle 44 may be utilized by a user to hold the applicator 6 in the user's hand(s). The trigger 46 may be a squeeze trigger that can be selectively operated by hand to start and stop delivery of the fluid 8 into the conduit 32. When the hand-operated trigger 46 is pulled from a start position toward the handle 44, this may cause the fluid 8 to flow through the applicator 6 and into the conduit 32. When the trigger 46 is released, it may return back to a start position and thus cause the flow of fluid 8 through the applicator 6 into the conduit 32 to stop. Other types of triggers maybe used, including a button actuator for example.

The applicator 6 may further include a mating flange 50, which mates with two clips 52A, 52B of the applicator 6 so as to secure/mount the applicator 6, and thus the nozzle 40, relative to the clips 52A, 52B and relative to the intake opening 36. The two clips 52A, 52B may each be arranged on opposite sides of the intake opening 36 and on the exterior surface 34 of the base component 30, and operable or configured to secure/mount the applicator 6 relative to the intake opening 36. The two clips 52A, 52B may be integrally molded, along with the base component 30 and conduit 32, as part of the distribution component 14.

Figure 6:
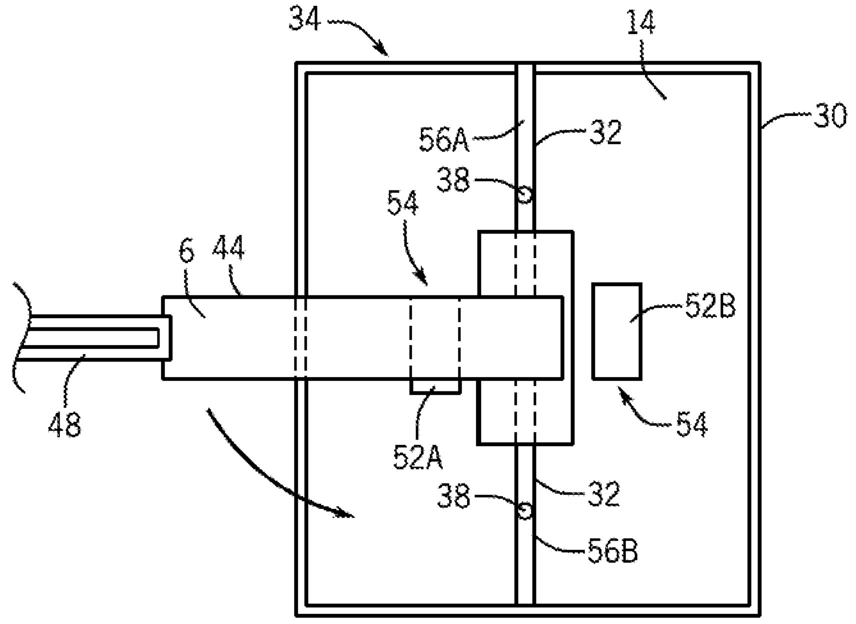
FIG. 6 is an end view of an applicator in an unlocked position relative to a distribution component according to the present subject matter.
Figure 7:
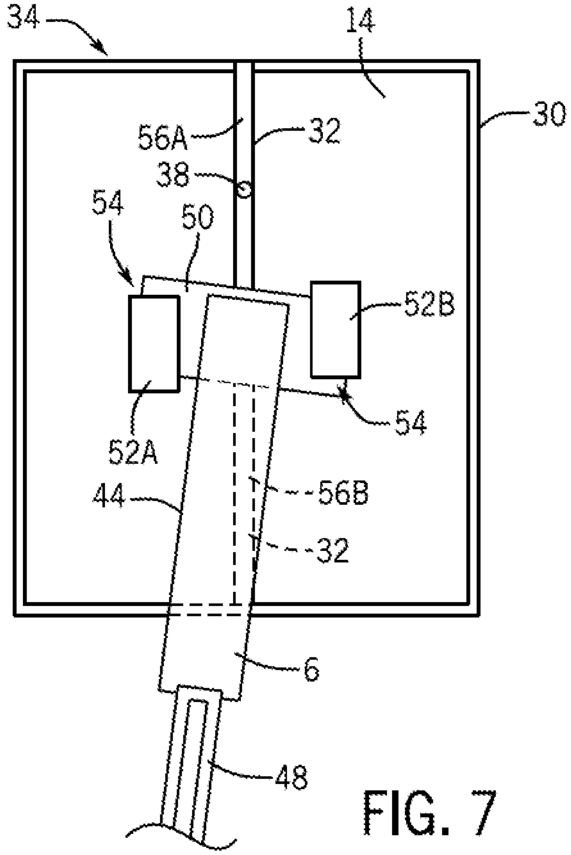
FIG. 7 is an end view of the applicator in a locked position relative to the distribution component of FIG. 6.
Figure 8:
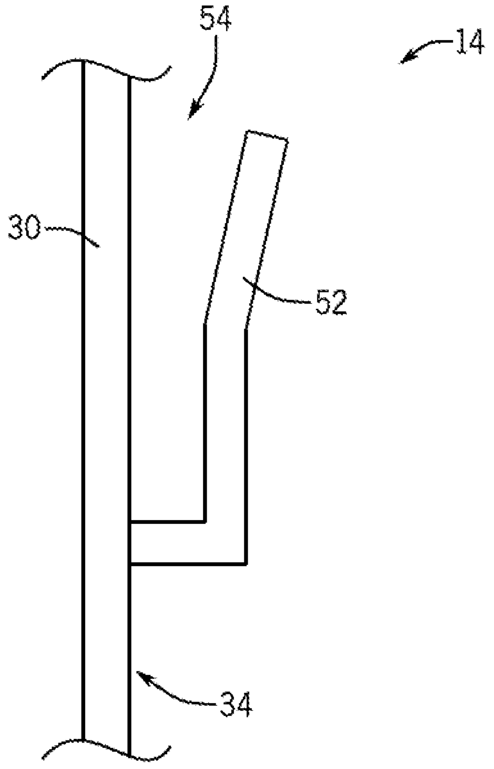
FIG. 8 is a partial side view of a distribution component showing a clip of the distribution component according to the present subject matter.

The mating of the two clips 52A, 52B and the mating flange 50 secure/mount the nozzle 40 relative to (i.e. inside) the intake opening 36, and press the sealing body 42 against the exterior surface 34 of the base component 30 to form the seal around the intake opening 36. The mating flange 50 may be locked into the clips 52A, 52B by inserting the nozzle 40 into the intake opening 36 (FIG. 6) and then rotating the applicator 6, and thus the mating flange 50, relative to the clips 52A, 52B, e.g. counterclockwise as shown by the arrow in FIG. 6, so that the mating flange 50 is moved between the clips 52A, 52B and the exterior surface 34 of the base component 30, thus locking the nozzle 40 inside the intake opening 36 and inhibiting the nozzle 40 from being removed from the intake opening. The clips 52A, 52B may each have a general L-shape with two legs, with one of the two legs being directly attached to the exterior surface 34 of the base component 30, and another of the two legs not being directly attached to the base component 30 (i.e. being free from direct connection with the exterior surface 34 of the base component 30) and thus creating an opening 54 through which the mating flange 50 can be rotated into the locked position (FIG. 7). To remove the applicator 6 from the intake opening 36, the applicator 6 is simply rotated the opposite way, i.e. clockwise, to an unlocked position (FIG. 6) such that the mating flange 50 is moved out from being between the exterior surface 34 of the of the base component 30 and the clips 52A, 52B, thus allowing the nozzle 40 to be removed from the intake opening 36. With reference to FIGS. 6-7, the left clip 52A has the opening 54 at the top, and the right clip 52*b* has the opening 54 at the bottom; but these could be reversed and the applicator 6 could be rotated clockwise to lock the mating flange 50 in the clips 52A, 52B and counterclockwise to unlock the mating flange 50 from the clips 52A. 52B. Alternatively, the two mating clips 52A, 52B may each be arranged on the frame 10 on opposite sides of the access opening 26.

The applicator 6 may have different designs, including a design where the applicator 6 is an automated applicator 6, where there is a different quick-connect/disconnect mating design for mating with the intake opening 36, and other changes.

Vehicle

The frame member 4, including a coating of the fluid 8 on the interior surface 16 of the frame 10, may be used alone or as a part of a wide-variety of vehicles, including a motor vehicle, sea or air vessel, or human powered vehicle such as a bicycle. The frame member 4 may be used as any part on the vehicle, including a portion of the vehicle frame, vehicle door, vehicle seat, or other component of the vehicle. In a non-limiting example, the frame member 4 is used as part of the vehicle frame and is rigid.

Method

A method of applying a coating to the interior surface 16 of the frame 10 includes as step of providing the frame 10 and a distribution component 14. The distribution component 14 may include a shell as the base component 30, and the conduit(s) 32 on the exterior surface 34 of the shell.

The distribution component 14 is arranged in the interior 12 of the frame 10 such that the intake opening 36 is arranged at the access opening 26 of the frame 10. This may be done, as previously described, by arranging the distribution component 14 between the two metal components 18, 20 when they are connected at the interface 22.

The fluid 8 is introduced from an exterior of the frame 10, through the access opening 26, through the intake opening 36, and into the conduit 32. This may be done using the applicator 6 as described herein. Delivery of the fluid 8 from a fluid source to the applicator 6, through the applicator 6 to the distribution component 14, and out of the distribution component 14 to the interior surface 16 of the frame 10, may be accomplished with a fluid pressure exerted by a pump, which may be associated with the fluid source, or with the applicator 6.

The fluid 8 is transported through the conduit 32, e.g. by fluid pressure exerted by the pump, from the intake opening 36 to the discharge opening(s) 38, where the fluid 8 is discharged from the discharge opening(s) 38 onto the interior surface 16 of the frame 10 to thereby form the coating of the fluid 8 on the interior surface 16.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A frame member comprising:

a frame defining an interior and including an access opening that provides access to the interior; and a distribution component arranged entirely in the interior of the frame, the distribution component including a base component and a conduit on an exterior surface of the base component, the conduit comprising an intake opening and a discharge opening;

wherein the access opening is sized such that the distribution component is nonremovably arranged in the interior of the frame, the distribution component defining a permanent structure confined entirely within the interior of the frame;

wherein the intake opening is arranged at the access opening and is operable to receive a fluid from an exterior of the frame, through the access opening, and into the conduit;

wherein the conduit is operable to transport the fluid from the intake opening to the discharge opening; and wherein the discharge opening is operable to eject the fluid out of the conduit onto an interior surface of the frame.

2. The frame member according to claim 1, wherein:

the frame includes a first metal component welded at an interface to a second metal component;

the first metal component and the second metal component define the interior; and the discharge opening is operable to discharge the fluid at the interface.

3. The frame member according to claim 1, wherein the base component is a molded polymer shell, and the conduit is integrally molded as part of the molded polymer shell.

4. The frame member according to claim 1, wherein the conduit includes a plurality of branches extending away from the intake opening.

5. The frame member according to claim 1, wherein the frame includes an internal feature that projects from the interior surface into the interior, and the distribution component surrounds the internal feature on three sides.

6. The frame member according to claim 1, wherein:
the distribution component further includes two clips, each of the two clips being L-shaped and having two legs, one of the two legs being attached to the base component and another of the two legs not directly attached to the base component,
the two clips are on opposite sides of the intake opening, and
each of the two clips is integrally molded with the base component as part of the distribution component.

7. A system including the frame member of claim 1, and an applicator operable to deliver the fluid from the exterior of the frame and into the conduit via the intake opening.

8. The system according to claim 7, wherein the applicator includes a nozzle operable to mate with the intake opening and a sealing body operable to create a seal with the intake opening during delivery of the fluid into the conduit.

9. The system according to claim 8, wherein the sealing body is operable to create the seal by being pressed against the exterior surface of the base component.

10. The system according to claim 7, wherein the applicator is operable by hand to selectively start and stop delivery of the fluid into the conduit.

11. The system according to claim 7, wherein the applicator includes a trigger to selectively start and stop delivery of the fluid into the conduit.

12. The system according to claim 7, wherein:
the distribution component includes a clip operable to mount the applicator relative to the intake opening; and
the applicator is mounted relative to the intake opening by mating a flange of the applicator with the clip, and rotating the applicator relative to the clip and to the intake opening.

13. A vehicle comprising the frame member of claim 1, and a coating of the fluid on the interior surface of the frame, wherein the fluid includes an anti-corrosion material operable to inhibit corrosion of the frame.

14. A method of applying a coating to an interior surface of a frame, the method comprising:
providing the frame and a distribution component, the frame defining an interior and including an access opening that provides access to the interior, the distribution component including a shell and a conduit on an exterior surface of the shell, the conduit comprising an intake opening and a discharge opening;
arranging the distribution component entirely in the interior of the frame such that the intake opening is arranged at the access opening, and sizing the access opening such that the distribution component is non-removably arranged in the interior of the frame, the distribution component defining a permanent structure confined entirely within the interior of the frame;
delivering a fluid from an exterior of the frame, through the access opening, through the intake opening, and into the conduit;
transporting the fluid through the conduit from the intake opening to the discharge opening; and
discharging the fluid from the discharge opening onto the interior surface of the frame to thereby form the coating of the fluid on the interior surface.

15. The method of claim 14, wherein:
the frame includes a first metal component welded at an interface to a second metal component so as to define the interior; and
the distribution component is arranged in the interior by being arranged between the first metal component and the second metal component, and then by welding the first metal component to the second metal component at the interface.

16. The method of claim 15, wherein the discharge opening discharges the fluid at the interface to form the coating on the interface.

17. The method of claim 14, wherein the fluid is delivered into the conduit using an applicator including a nozzle mated with the intake opening and a sealing body creating a seal with the intake opening.

18. The method of claim 17, wherein the applicator is a hand-held tool including a hand-operated trigger operable to selectively start and stop the delivery of the fluid into the conduit.

19. The method of claim 17, further comprising securing the applicator relative to the intake opening including by mating a flange of the applicator to a clip of the distribution component and rotating the flange relative to the clip to lock the applicator relative to the intake opening.

20. The method of claim 14, wherein the fluid includes an anti-corrosion wax.

* * * * *